Oct. 16, 1934.  W. T. McCOY  1,977,520
AUTOMOBILE COMBINED SEAT AND BED
Filed Nov. 25, 1932  2 Sheets-Sheet 1
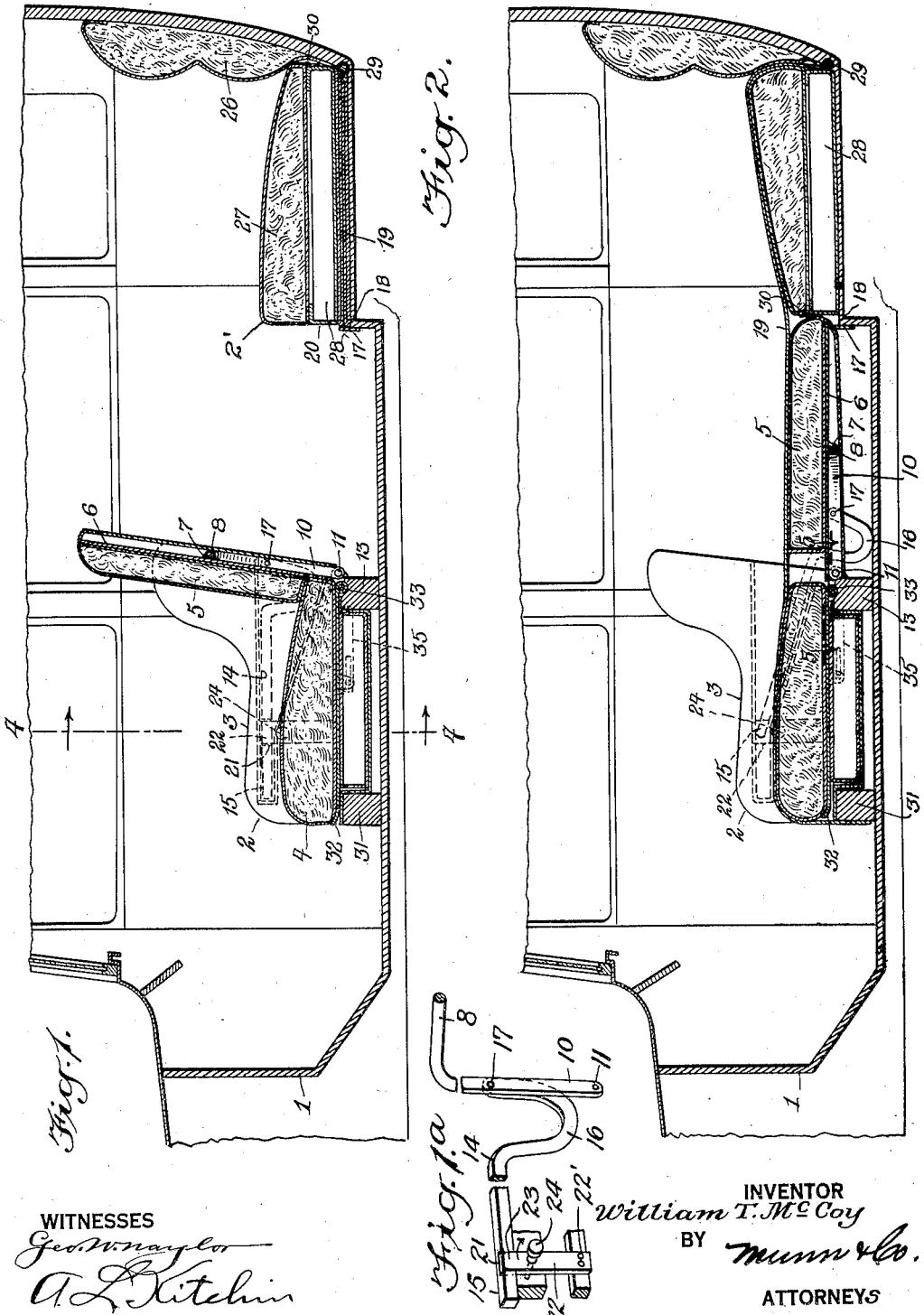
WITNESSES
INVENTOR
William T. McCoy
BY Munn & Co.
ATTORNEYS Oct. 16, 1934.  W. T. McCOY  1,977,520
AUTOMOBILE COMBINED SEAT AND BED
Filed Nov. 25, 1932   2 Sheets-Sheet 2
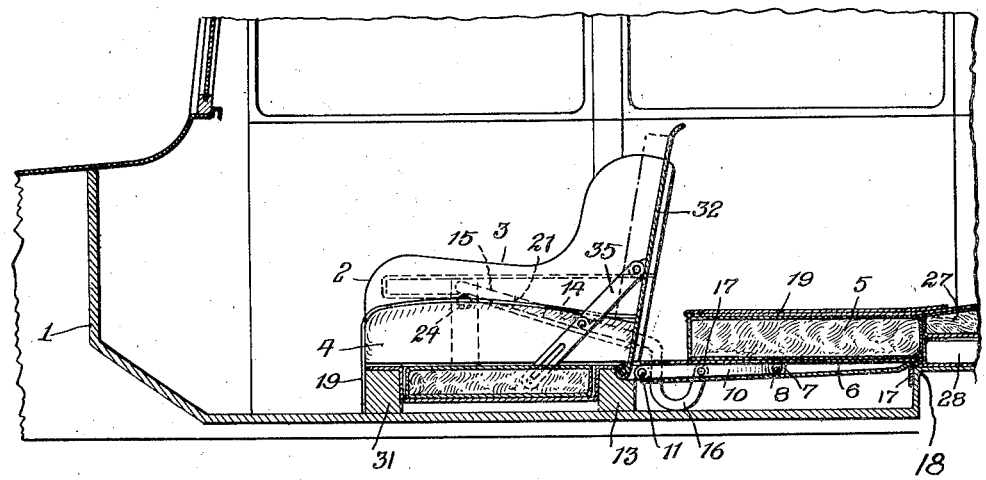
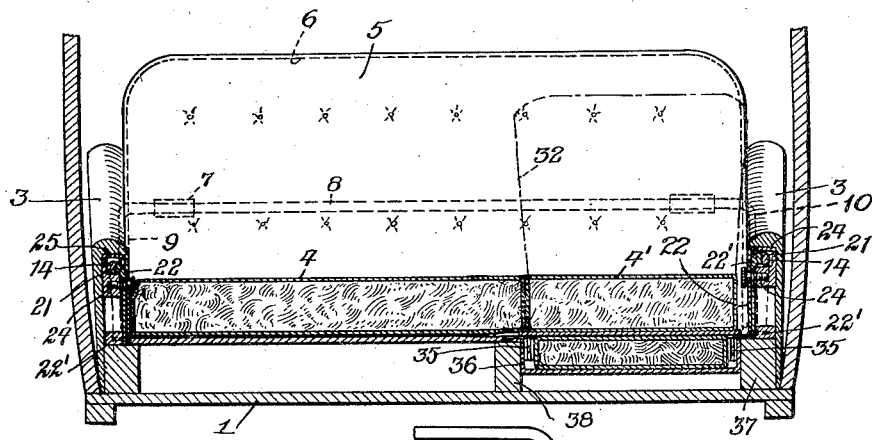
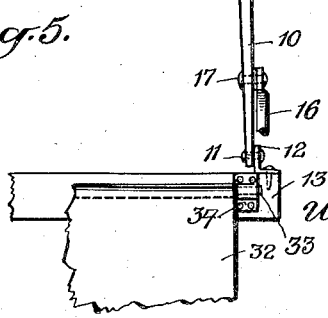
WITNESSES
INVENTOR
William T. McCoy
BY
ATTORNEYS

UNITED STATES PATENT OFFICE 1,977,520

AUTOMOBILE COMBINED SEAT AND BED

William T. McCoy, New York, N. Y., assignor of one-half to Louis Dubin, New York, N. Y.

Application November 25, 1932, Serial No. 644,362

3 Claims. (Cl. 155—7)

This invention relates to automobiles and particularly to the interior construction of the body, the object being to provide an improved combined seat and body which when in one position presents in appearance the usual seat structure, and when in another position presents an automobile bed structure.

Another object of the invention is to provide in an automobile body a combined seat and bed structure wherein the back of the front seat acts as a connecting member between the seat portion of the front seat and the back seat so as to present a bed construction.

An additional object is to provide an improved construction of the seats in an automobile body wherein parts of the seats may be adjusted and rearranged into substantially horizontal alignment, the structure including a formation permitting the storage of a sheeting under one seat when the same is acting in its capacity as a seat, and permitting the sheeting to be pulled over the rearranged seat structures when acting as a bed so that the seat structures will be covered.

In the accompanying drawings—

Figure 1 is a fragmentary longitudinal vertical sectional view through part of an automobile body disclosing an embodiment of the invention;

Figure 1a is a detailed, fragmentary, perspective view with certain of the parts in section, illustrating a locking arm and associated parts.

Figure 2 is a view similar to Figure 1 but showing the seats rearranged to present a bed structure;

Figure 3 is a view similar to the left hand portion of Figure 2, but with the driver's seat adjusted for receiving the driver, while the remaining part of the seat structure is arranged as a bed;

Figure 4 is a sectional view through Figure 1 approximately on the line 4—4;

Figure 5 is a detailed fragmentary top plan view of certain parts illustrated in Figure 2, illustrating the hinged arrangement for the driver's seat and the hinged support for the back of the main front seat.

Referring to the accompanying drawings by numerals 1 indicates the body of an automobile of any desired type, for instance, the sedan type. Arranged in the body is a front seat 2 and a rear seat 2′ having the general appearance of seats now in common use in automobile bodies but constructed in a special way so that they may be used in the usual way of front and rear seats, or may be adjusted to be used as a bed. The front seat 2 is provided with side arms 3, a seat cushion 4 and an auxiliary seat cushion 4′. These cushions usually act as the usual front seat cushion but are independently mounted and positioned so as to be independently removed at any time, cushion 4′ being left in place if desired when the back 32 is being used. The front seat 2 is also provided with a back 5, said back having preferably a metal back panel 6 carrying straps 7 through which a pivotally mounted bracing bar 8 extends, said bar having downwardly extending arms 9 and 10, said arms at their lower ends being pivotally connected by pins 11 to suitable supporting arms 12 connected to the block 13, which in turn is rigidly secured to the bottom of the body 1 in any desired manner. The U-shaped bracing bar 8 pivotally supports the back 5 either in its upright position, as shown in Fig. 1, or in its lowered position, as shown in Fig. 2, but in order to lock the back in its upright position a locking bar 14 is provided for the respective depending arms 9 and 10. As both structures are identical a description of one will apply to both.

As illustrated in Figures 1 and 1a, the locking bars 14 are each provided with a straight section 15 and a U-shaped section 16. One end of the U-shaped section 16 is pivotally connected at 17 with the arm 10 so that when the parts are in their lowered position the U-shaped member 16 will act as a supporting leg for helping the pin 11 to support the back 5.

In addition the back 5 is adapted to rest against the panel 17′ or against the shoulder 18. The panel 17′ is intended to act as a member for holding the sheeting 19 beneath the rear seat box 20. The section 15 of the locking bar 14 is provided with a notch 21 which is flattened on the surface as shown in Fig. 1a. The locking member 22 secured at one end by screw 22′ is preferably a spring so that the extension 23 is adapted to readily move into the notch 21 and press against the bar 14 through the action of the screw 24. When this screw is tightened the locking member 22 secures the locking bar 14 against movement and, consequently, holds the back 5 in its upright position. As illustrated in Figures 1a, the locking bar 14 is slidably mounted and is also capable of swinging movement after the locking spring 22 has been released. When the screw 24 is loosened spring 22 automatically bows outwardly at the upper end so as to move out of notch 21, whereupon the bar 14 is free and the back 6 may then be swung downwardly to the position shown in Fig. 2. Whenever desired the back 6 may be again swung upwardly to the position shown in Fig. 1, but in order to hold the same in this position screw 24 must be operated for positively forcing the extension 23 of spring 22 into the notch 21. When the parts are in the position shown in Fig. 1a, the back is locked in its raised position and cannot accidentally be released.

When it is desired to lower the back 5, screw 24 is loosened until the resilient or spring lock 22 swings back out of the way. It is to be understood that a structure such as just described is found on both sides of the device, as clearly illustrated in Fig. 4. It is also understood that a hollow member 25 is secured interiorly of the arm 3 by any desired means and acts as a guide and receptacle for the locking bar 14, and also as means into which the screw 24 may be threaded.

At the rear, the seat 2' is made up of a cushion back 26, a back seat cushion 27 and a rear seat box 20 which is open at the top but closed on all other sides so as to present a chamber for the reception of clothing or articles of any kind. Beneath the box 20 is provided a space for receiving the sheeting 19 which is preferably secured to the automobile body 1 by any desired means at the point 29.

It will also be noted that cushion 27 is hinged at 30 to the box 20 so that these two members are removed as a unit when it is desired to use the sheeting 19. After these members have been removed the sheeting 19 is pulled out and then box 20 and cushion 27 reversed and placed in position as shown in Fig. 2. The back 5 is then lowered to the position shown in Fig. 2 and the sheeting 19 is pulled over all the cushions so that the front end will hang down over the front bar 31, thus providing a cover of heavy sheeting for the various cushions. Preferably the sheeting 19 is comparatively heavy canvas or other material and, if desired, on top of this sheeting ordinary bed sheets or other bed clothes may be placed so as to use the rearranged seats as a bed for one or more persons.

Under some circumstances it may be desired to drive the automobile when the bed structure is in use. When this is the case part of the front of sheeting 19 is pulled to one side, the auxiliary cushion 4' is temporarily removed and the metal back plate 32 is raised from the position shown in Fig. 2 to that shown in Fig. 3. This plate as shown in Fig. 5 carries a pivot pin 33 at the bottom edge, the same extending through a suitable bracket 34 secured to the block 13. A pair of toggle links 35 are arranged on each side of the metal back 32 and are slidably connected with the metal pan or lining 36 which is rigidly secured to the bars 37 and 38. The pin is carried by each side of the pan 36, said pins extending through respective slots in the links 35 so that the links may be moved to the position shown in Fig. 3 when the back 32 is in use, and may be folded to the position shown in Fig. 4 when the back is not in use.

It will be understood that when the metal back has been raised to the position shown in Fig. 3, the auxiliary cushion 4' is replaced. This will allow the driver to operate the automobile and have a seat with a back so that he may drive in comfort. The remaining part of the front seat forms part of the bed, as illustrated in Fig. 2, so that one or more persons may occupy the bed while the driver continues to drive the car.

After the parts have been moved to the position to act as a bed and it is desired again to move them back so as to act as seats, the metal back 32 is lowered, if the same has been used, and the auxiliary cushion 4' is replaced. The sheeting 19 is then thrown over on to the back seat and the back 5 merely swung up to its correct position, after which the screws 24 are tightened and the front seat will then be locked in its correct position as a seat. The cushion 27 and box 20 at the rear are then removed temporarily and the sheeting again folded to the position shown in Fig. 1. The cushion 27 and box 20 are then replaced, as shown in Fig. 1, and the automobile is in its normal position with seats acting as seats.

I claim:—

1. In a device of the character described including front and rear automobile seats, said front seat being provided with a back swingable downwardly into the same plane as the seat portion of the back seat for forming a bed, said front seat being provided with a cushion divided into two sections, an auxiliary back of substantially the width of one person arranged beneath one of said sections, said last mentioned section being removable so that said auxiliary back may be swung to a substantially vertical position whereby the driver may use part of said front seat and the auxiliary back as a back support while the remaining part of the front seat coacts with the back seat for producing a bed.

2. The combination with an automobile body of a front seat provided with a back, means for pivotally mounting said back so that it may swing downwardly to a substantially horizontal position, said means including a bar secured to said back, a side arm extending from each end of said bar, means for pivotally mounting said side arms at their outer ends, said last mentioned means being positioned adjacent the rear edge of said front seat, a locking bar for each of said arms having one end pivotally connected to the respective arms intermediate the ends thereof, each of said locking bars having a notch, a resilient member for each of said locking bars positioned in front of said back and arranged to have a part thereof opposite the notches in said locking bars and of a size and shape to fit into the respective notches, and a screw member associated with each of said resilient members for forcing part of the resilient members into the respective notches for positively locking the bars and the back against swinging movement.

3. The combination with an automobile body of a rear seat arranged in said body, a front seat arranged in said body, a back for said front seat, a bar extending through said back substantially midway between the top and bottom thereof, straps for securing said bar to said back, said bar having a supporting arm at each end positioned in respect to said bar to form a substantially U-shaped structure, means for hingedly mounting the ends of said arms opposite said bar, a locking bar for each of said supporting arms, means for pivotally connecting one end of the respective locking bars to the respective supporting arms, each of said locking bars having adjacent the ends connecting to said supporting arms U-shaped portions, each of said locking bars having a notch, and manually actuated means normally projecting into the notches of the respective locking bars for locking the locking bars against movement and said back in a substantially vertical position, said back when released being adapted to swing downwardly so that the upper surface thereof will be in substantially the same horizontal plane as the top of the front and rear seats, said U-shaped portions acting as supporting legs for said back when the back is in a horizontal position.

WILLIAM T. McCOY.